United States Patent [19]
Tsuchida

[11] Patent Number: 5,991,549
[45] Date of Patent: Nov. 23, 1999

[54] CAMERA HAVING A STROBE UNIT

[75] Inventor: Keiichi Tsuchida, Hachioji, Japan

[73] Assignee: Olympus Optical Co., Ltd., Tokyo, Japan

[21] Appl. No.: 08/445,875

[22] Filed: May 22, 1995

[30]  Foreign Application Priority Data

May 24, 1994 [JP] Japan .................................. 6-109831

[51] Int. Cl.⁶ .............................. G03B 13/18; G03B 15/05
[52] U.S. Cl. .......................................... 396/158; 396/164
[58] Field of Search .................................. 354/413–419, 354/106, 126, 145.1; 362/18, 4, 16; 348/371, 370; 396/158, 157, 164–165, 319, 155, 198, 275–276; 315/241 P

[56]  References Cited

U.S. PATENT DOCUMENTS

| | | | |
|---|---|---|---|
| 4,129,898 | 12/1978 | Ohrstedt ................................... | 362/7 |
| 4,785,322 | 11/1988 | Harrison et al. ....................... | 396/198 |
| 5,070,355 | 12/1991 | Inoue et al. ........................... | 354/413 |
| 5,109,248 | 4/1992 | Petrakos et al. ...................... | 396/164 |
| 5,218,392 | 6/1993 | Sakamoto et al. .................... | 396/319 |
| 5,307,100 | 4/1994 | Kubo ..................................... | 396/319 |
| 5,432,863 | 7/1995 | Benati et al. ......................... | 382/167 |
| 5,485,201 | 1/1996 | Aoki et al. ............................ | 348/223 |
| 5,541,686 | 7/1996 | Stephenson .......................... | 396/276 |

FOREIGN PATENT DOCUMENTS

52-80120 5/1977 Japan.

Primary Examiner—Safet Metjahic
Assistant Examiner—Michael Dalakis
Attorney, Agent, or Firm—Louis Weinstein

[57]  ABSTRACT

The present invention provides a camera having strobe unit, comprising a strobe flashing unit for emitting illumination light toward an object, a switch for switching states of flashlight emanating from the strobe flashing unit by selecting normal flashlight or flashlight that is effective in alleviating a red-eye phenomenon and that contains less red light than normal flashlight, an information recorder for recording photographic information on film, and a recording control unit for allowing the information recorder to record flashlight selected by the switch.

20 Claims, 10 Drawing Sheets

SPECTRUM OF FLASHLIGHT
EMANATING FROM AN
XENON TUBE

FIG.4

SPECTRUM OF SUNLIGHT

CAMERA HAVING A STROBE UNIT

BACKGROUND OF THE INVENTION

1. Field of the Invention

The present invention relates to a camera having a strobe unit for emitting flashlight that is effective in reducing occurrence of a red-eye phenomenon.

2. Description of the Related Art

In the past, when a human being is photographed using a light source such as a strobe in a dark place or at night, a so-called red-eye phenomenon has occurred; that is, the irises (strictly speaking, the insides of the pupils) of the human being have appeared in red in the print. This is attributable to the fact that very strong light emanating from the strobe enters the retinae of the eyes for a very short period of time, and then light that has not been absorbed by the visual cells of the retinae is discharged outside the eyeballs.

A technical means for alleviating the red-eye phenomenon is disclosed in Japanese Patent Laid-Open No. 58-48088 (Japanese Application Publication No. 58-48088), wherein for stroboscopic photography, strobe light is emitted to pre-flash an object in order to shrink the pupils of the object, and then main flashing is performed for photography. This technical means makes it possible to alleviate a red-eye phenomenon even when the situation is prone to a red-eye phenomenon.

However, the technical means described in the Japanese Patent Laid-Open No.58-48088 has such a problem that since pre-flashing, which is performed after a Release button is pressed and before main flashing is carried out, lasts for about one second, an object is dazzled and a long time lag arises in releasing.

OBJECTS AND SUMMARY OF THE INVENTION

The first object of the present invention is to provide a camera having a strobe unit for alleviating a red-eye phenomenon without creating a time lag in releasing.

The second object of the present invention is to provide a camera making it easy to correct a print.

The third object of the present invention is to provide a camera making it easy to correct a print so as to alleviate a red-eye phenomenon.

The fourth object of the present invention is to produce a print that is little affected by a red-eye phenomenon.

The fifth object of the present invention is to provide a camera capable of changing the spectrum of flashlight despite the simple structure.

The sixth object of the present invention is to provide a camera that when the situation is prone to a red-eye phenomenon, permits a print little affected by a red-eye phenomenon.

The seventh object of the present invention is to provide a camera capable of accurately predicting occurrence of a red-eye phenomenon.

The eighth object of the present invention is to provide a camera capable of moving a flashlight spectrum changing means effortlessly.

The ninth object of the present invention is to provide a camera capable of controlling the spectrum of flashlight freely.

The tenth object of the present invention is to provide a camera that hardly causes a red-eye phenomenon and that permits a proper print according to information representing an intensification instruction.

The eleventh object of the present invention is to provide a camera that when the situation is prone to a red-eye phenomenon, can change the spectrum of flashlight so as to produce a print little affected by a red-eye phenomenon.

The twelfth object of the present invention is to provide a camera capable of optimizing the spectrum of flashlight so as to avoid a red-eye phenomenon.

The thirteenth object of the present invention is to provide a strobe unit that is resistive to a red-eye phenomenon.

The fourteenth object of the present invention is to provide a camera capable of reducing red light alone so as to prevent occurrence of a red-eye phenomenon.

The fifteenth object of the present invention is to provide a camera that records the fact that flashing is performed in such a manner as to alleviate a red-eye phenomenon and that permits a proper print.

Briefly, a camera having a strobe unit in accordance with the present invention comprises:

- a strobe flashing means for emitting illumination light toward an object;
- a switching means for switching states of flashlight emanating from the strobe flashing means by selecting normal flashlight or flashlight that is effective in alleviating a red-eye phenomenon and that contains less red light than is present in a normal flashlight;
- an information recording means for recording photographic information on film; and
- a recording control means for allowing the information recording means to record flashlight selected by the changing means.

The objects and advantages of the present invention will be apparent from the detailed description below.

DETAILED DESCRIPTION OF THE PREFERRED EMBODIMENTS

Referring to the drawings, embodiments of the present invention will be described.

Figure 1:
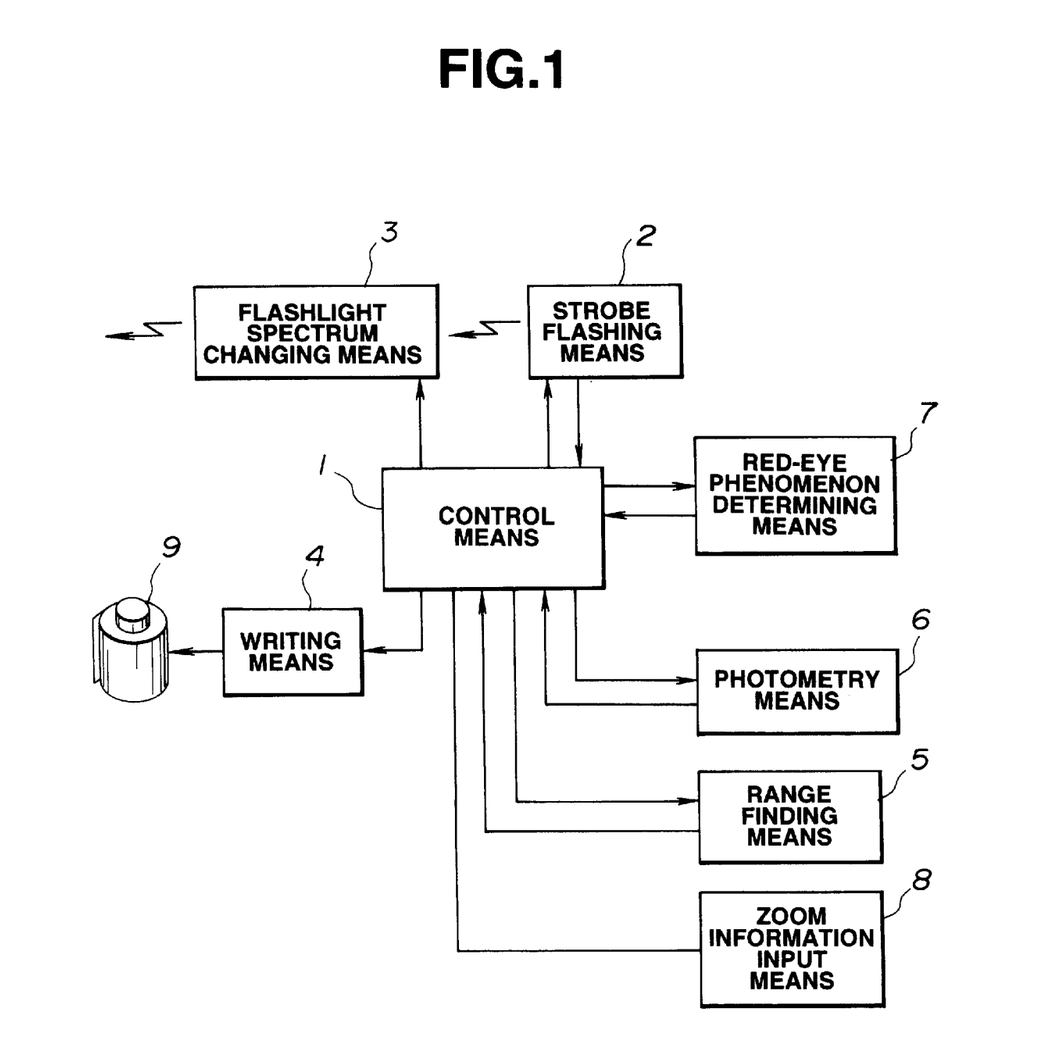
FIG. 1 is a block diagram showing the major components of a camera having a strobe unit in accordance with a first embodiment of the present invention.

FIG. 1 is a block diagram showing the major components of a camera having a strobe unit in accordance with the first embodiment of the present invention.

The camera of the first embodiment has a control means 1 that is responsible for control of the whole camera and that is realized by, for example, a microcomputer. The control means 1 has a plurality of input and output terminals. Connected to the control means 1 are a strobe flashing means 2 for controlling the flashing of a strobe, a flashlight spectrum changing means 3 for changing the spectrum of strobe light, a writing means for storing such information as photographic parameters for a camera and the contents of the flashlight spectrum changing means 3 as given data in a magnetic recording area of film 9 provided with a magnetic recording means, a range finding means 5 for measuring a distance to an object, a photometry means 6 for metering brightness of an object, a red-eye phenomenon determining means 7 for outputting a given signal in the situation prone to a red-eye phenomenon, and a zoom information input means 8 for detecting the power of a zoom lens. The control means 1 is further connected to a film wind and rewind means and a shutter means which are not shown, and controlling them.

Figure 2:
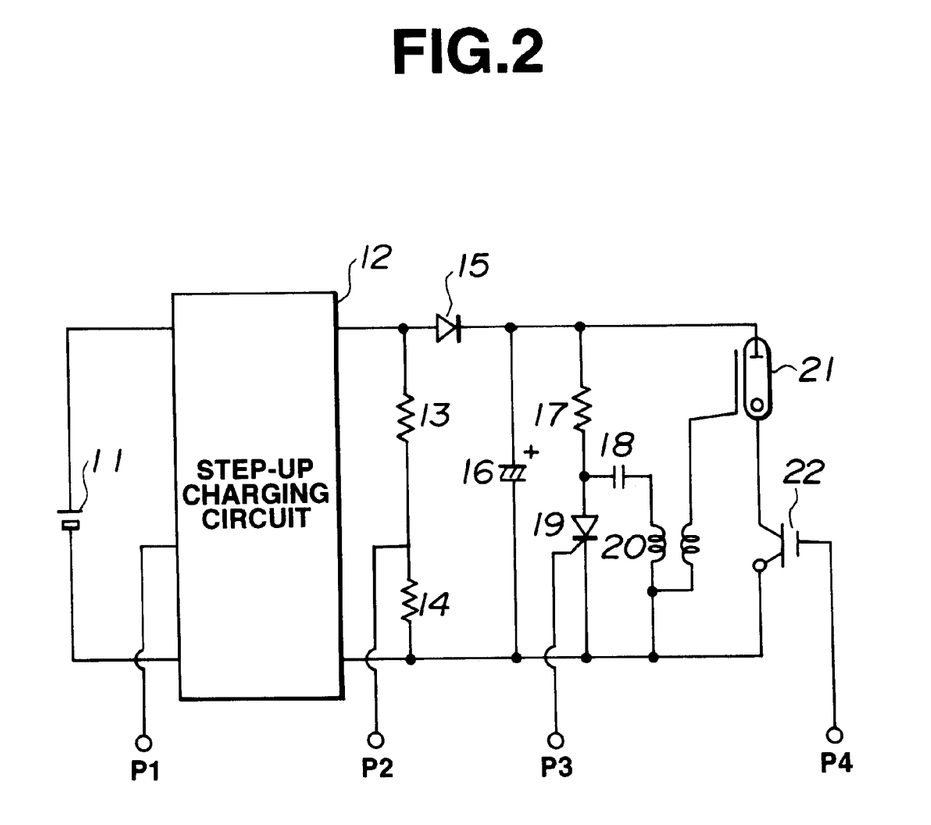
FIG. 2 is a circuit diagram showing the circuit elements of a strobe flashing means in the first embodiment.

FIG. 2 is an electric circuit diagram showing the circuit elements of the strobe flashing means 2 in the first embodiment.

As illustrated, the strobe flashing means 2 includes a power supply 11 for generating a given low voltage, and a step-up charging circuit 12 connected in series with the power supply 11 and designed to step up the low voltage to a charging voltage for use in charging a main capacitor 16. The step-up charging circuit 12 has a control port P1 connected to the control means 1. An output terminal of the step-up charging circuit 12 is connected to a series circuit composed of a resistor 13 and a resistor 14, whereby voltage to be applied to the main capacitor 16 is divided into fractions. A control port P2 extends from between the resistors 13 and 14, and is linked to the control means 1, whereby the control means 1 monitors the charging voltage to be applied to the main capacitor 16. When the charging voltage to be applied to the main capacitor 16 reaches a given value, the control means 1 recognizes the voltage across the resistor 14 as a full charge voltage, and de-energizes the step-up charging circuit 12 so as to stop charging.

The output terminal of the step-up charging circuit 2 is connected to the main capacitor 16 via a reverse-current prevention diode 15. When the step-up charging circuit 12 is de-energized, the diode 15 prevents current from flowing from the main capacitor 16 into the series circuit composed of the resistors 13 and 14.

Connected across the main capacitor 16 are a trigger circuit composed of a resistor 17, a capacitor 18, a thyristor 19, and a trigger coil 20 and a series circuit composed of a discharge tube 21 and a semiconductor current control device 22. One terminal of the trigger coil 20 is connected to a trigger electrode of the discharge tube 21, whereby a high-voltage trigger is applied to the electrode. The thyristor 19 and semiconductor current control device 22 have control ports P3 and P4 respectively. The thyristor 19 and semiconductor current control device 22 are both connected to the control means 1 and thus controlled by the control means 1.

In the initial state, the control means 1 turns off the thyristor 19. This causes charging current flowing from the step-up charging circuit 12 to pass through the resistor 17 and stagnate in the capacitor 18. Thereafter, an on signal is supplied from the control means 1 to the thyristor 19 via the gate terminal (control port P3) thereof. The charge stored in the capacitor 18 then flows from the capacitor 18 through the anode and cathode of the thyristor 19 to the primary winding of the trigger coil 20 and then returns to the capacitor 18. With a change in current flowing in the primary winding of the trigger coil 20, a high-voltage trigger is applied to the secondary winding thereof and eventually to the discharge tube 21.

Figure 3:
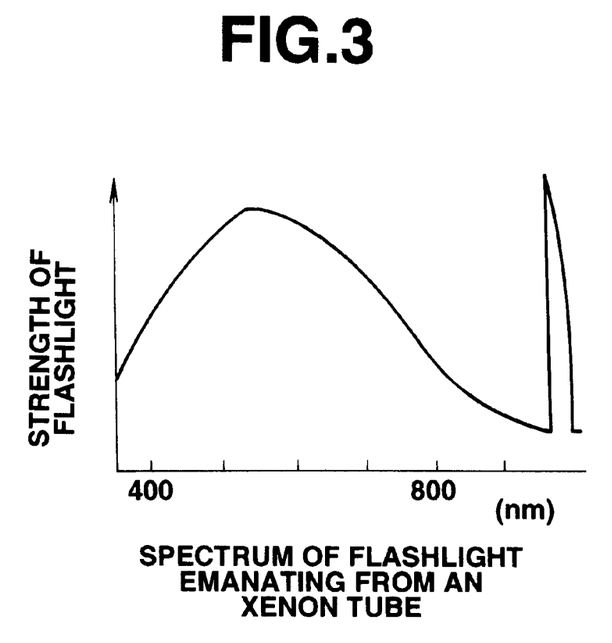
FIG. 3 is a graph indicating the spectrum of flashlight emanating from a discharge tube in the first embodiment.
Figure 4:
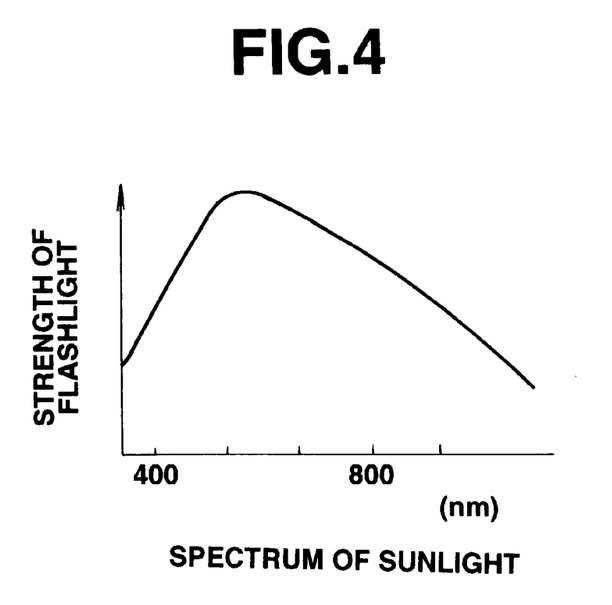
FIG. 4 is a graph indicating the spectrum of sunlight.

FIG. 3 is a graph indicating the spectrum of flashlight emanating from the discharge tube 21. FIG. 4 is a graph indicating the spectrum of sunlight.

The discharge tube 21 is an Xe tube containing xenon gas. As long as visible light is concerned, the spectrum shown in FIG. 3 of flashlight emanating from the discharge tube 21 is substantially identical to the one of sunlight shown in FIG. 4.

While the discharge tube 21 is flashing, when the semiconductor current control device 22 receives a flashing stop signal from the control means 1 via the control port P4 thereof, the semiconductor current control device 22 cuts off current flowing into the discharge tube 21 so that the discharge tube 21 will stop flashing.

Figure 5:
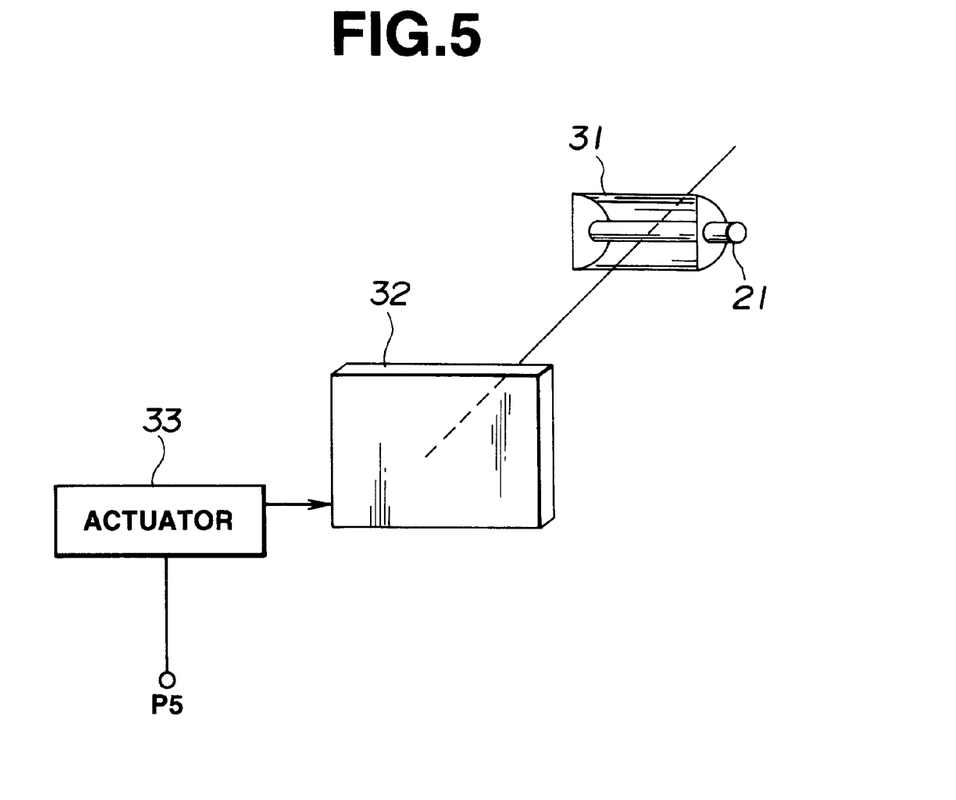
FIG. 5 is an exploded perspective view showing the major components of a flashlight spectrum changing means in the first embodiment.

FIG. 5 is an exploded perspective view showing the major components of the flashlight spectrum changing means 3 (See FIG. 1).

As shown in FIG. 5, the flashlight spectrum changing means 3 includes a reflector 31 for converging light emanating from the discharge tube 21 and irradiating light to an exposure zone of a camera, a filter 32 movable to a position in front of the reflector 31, and an actuator 33 for moving the filter 32 to a given position in response to a signal applied to a control port P5 by the control means 1. The actuator 33 includes a driving source such as a motor, a driven member that is driven by the driving source, and a drive circuit for driving the driving source. The driving source is driven on the basis of a control signal applied to the control port P5 by the control means 1.

Figure 6:
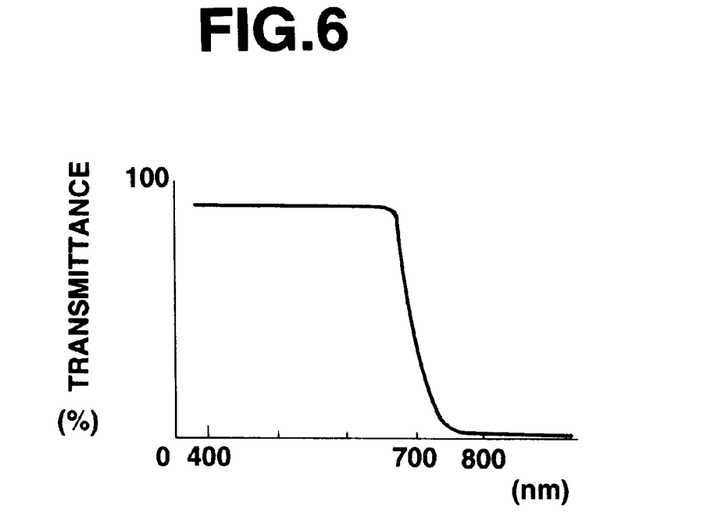
FIG. 6 is a graph showing a characteristic curve plotted to indicate transmittance of a filter in the first embodiment.

FIG. 6 is a graph showing a characteristic curve plotted to indicate the transmittance of the filter 32.

As illustrated, the filter 32 is a low-pass filter possessing a low transmittance with respect to light of relatively large wavelengths (red light having wavelengths of approximately 650 nm or more). The filter 32 is driven by the actuator 33 and movable to a position being in front of the reflector 31 and enabling reception of all the light reflected from the reflector 31 and to a position being away from the reflector 31 and disabling reception of the light.

When the filter 32 is driven by the actuator 33 that has received a control signal (which will be described in detail) from the control means 1 and moved to the position being in front of the reflector 31 and enabling reception of all the light reflected from the reflector 31, flashlight emanating from the discharge tube 21 in the strobe flashing means 2 passes through the filter 32 to have a spectrum from which wavelengths of red light are removed.

On the other hand, when the filter 32 is moved to the position disabling reception of light emanating from the reflector 31, the spectrum of flashlight is not changed but normal flashlight is emitted from the discharge tube 21. As described previously, the position of the filter 32 is changed with a control signal sent from the control means 1 to the actuator 33.

Figure 7:
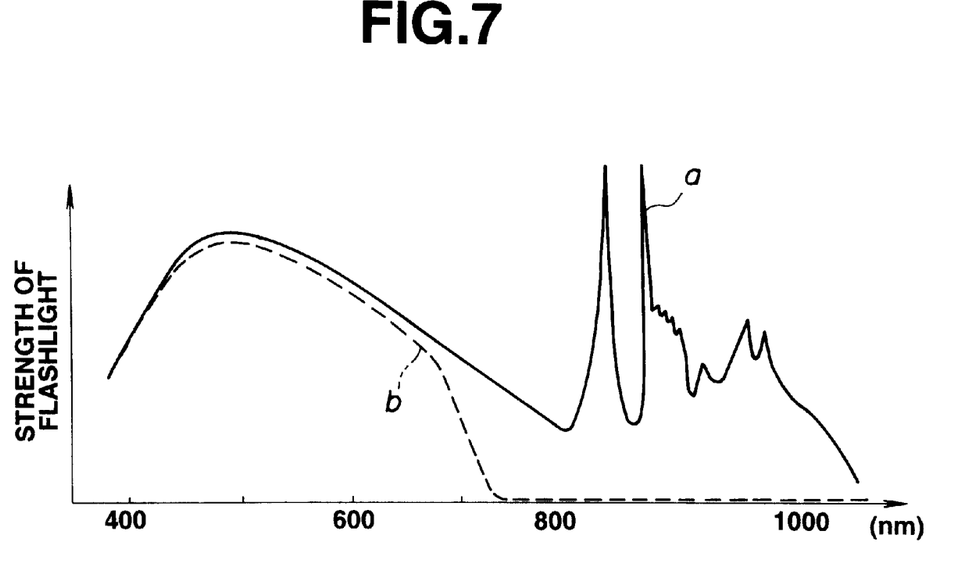
FIG. 7 is a graph indicating examples of the spectrum of flashlight emanating from a discharge tube in a strobe flashing means and of the spectrum of flashlight passing through the flashlight spectrum changing means in the first embodiment.

FIG. 7 is a graph detailing examples of the spectrum of flashlight emanating from the discharge tube 21 in the strobe flashing means 2 and of the spectrum of flashlight passing through the flashlight spectrum changing means 3.

In FIG. 7, reference character a denotes the spectrum of flashlight emanating from the discharge (xenon) tube 21 in the strobe flashing means 2. Reference character b denotes the spectrum of flashlight irradiated to an object via the flashlight spectrum changing means 3. As apparent from the drawing, the spectrum b has large wavelengths removed by the filter 32.

Figure 8:
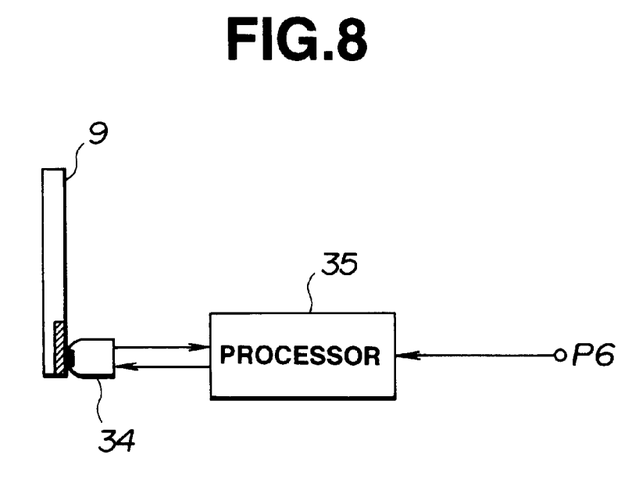
FIG. 8 is an explanatory diagram showing the components of a writing means in the first embodiment.

FIG. 8 is an explanatory diagram concerning the components of the writing means 4 (See FIG. 1).

As illustrated, the writing means 4 includes a magnetic head 34 that, while the film 9 provided with a magnetic recording means is being wound or rewound, writes information such as photographic parameters set in the camera and the spectrum of flashlight emanating from a strobe in the magnetic recording area of the film 9, and a processor 35 for receiving electric variations from the control circuit 1 via a control port P6 and converting the electric variations into magnetic variations.

After the flashlight spectrum changing means 3 is driven, when it is found that large wavelengths of red light are somewhat removed from the spectrum of flashlight emanating from the discharge tube 21 by means of the filter 32, the control means 1 supplies a signal to the processor 35 and thus allows the magnetic head 34 to record in the magnetic recording area of the film 9 the fact that red light having large wavelengths is reduced.

The range finding means 5 is a known means for measuring a distance from the camera to an object. The photometry means 6 is a known means for metering brightness of an object and determining an exposure value. The zoom information input means 8 is a means for detecting the power of a zoom lens. These means transmit data representing the results of measurement or detection to the control means 1.

When the situation is prone to a red-eye phenomenon, the red-eye phenomenon determining means 7 (See FIG. 1) supplies a signal to the control means 1 on the basis of information sent from the range finding means 5, photometry means 6, and zoom information input means 8. The control means 1 supplies a control signal to the actuator 33 (See FIG. 5) in the flashlight spectrum changing means 3 in response to a signal sent from the red-eye phenomenon determining means 7, so that the filter 32 will be placed in front of the discharge tube 21 in order to reduce red light from strobe light. Thus, the filter 32 removes red light from strobe flashlight emanating from the discharge tube 21.

Figure 9:
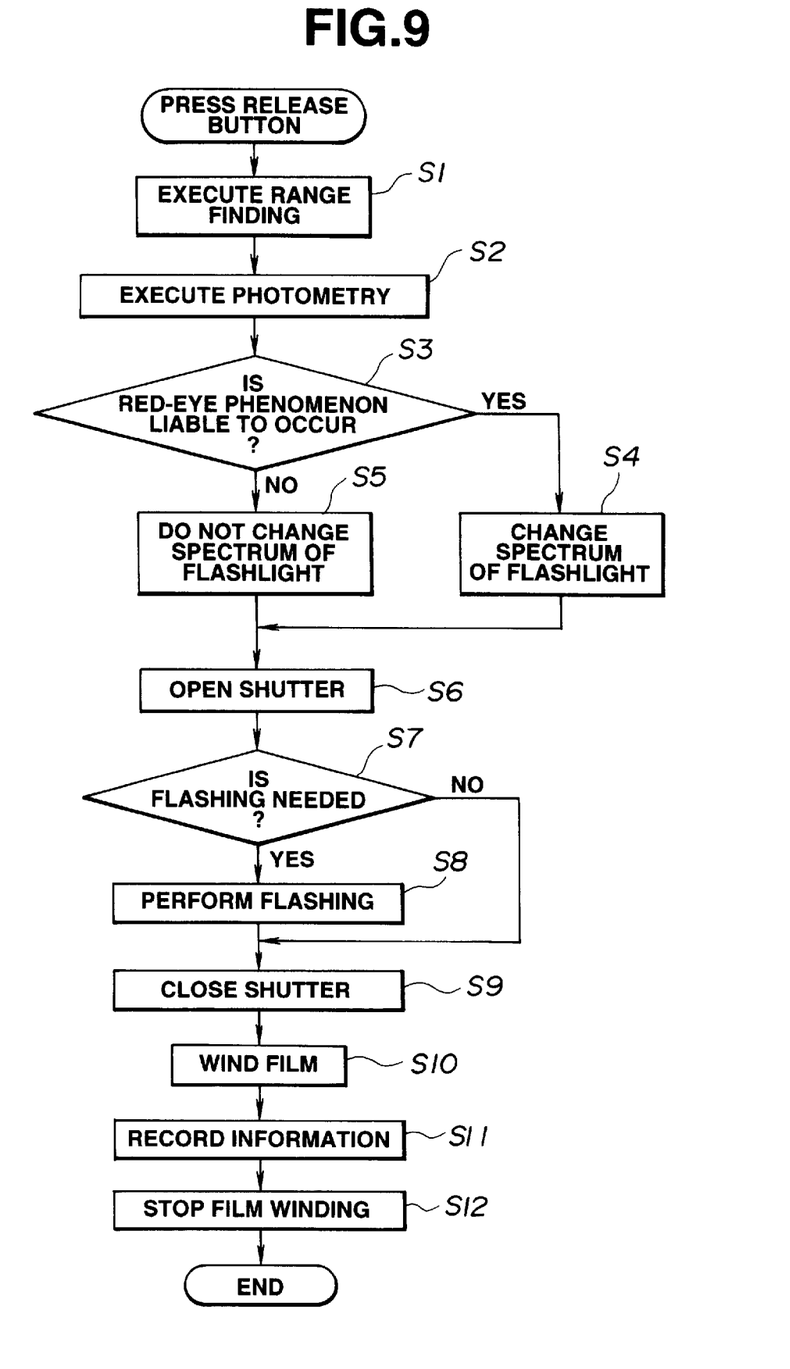
FIG. 9 is a flowchart describing actions taken in the first embodiment.

Next, the operation of this embodiment will be described with reference to the flowchart of FIG. 9.

When a Release button that is not shown is pressed, the camera starts operating. The range finding means 5 measures a distance (step S1) and places resultant data in a memory, which is not shown, preserved in the control means 1. The photometry means 6 meters brightness of an object, and the zoom information input means 8 measures a focal length of a zoom lens at the same time. The data resulting from the photometry and the measurement of a focal length of a zoom lens is placed in a memory, which is not shown, in the control means 1 (step S2).

On the basis of the data resulting from ranging finding, photometry, and measurement of a focal length of a zoom lens, the red-eye phenomenon determining means 7 determines whether an object is likely to cause a red-eye phenomenon (step S3). If the situation is prone to a red-eye phenomenon, the control means 1 activates the flashlight spectrum changing means 3 and thus drives the filter 32 so that strobe flashlight emanating from the discharge tube 21 will have the spectrum from which wavelengths of red light are removed.

If it is determined at step S3 that the situation is not prone to a red-eye phenomenon, the control means 1 activates the flashlight spectrum changing means 3 and thus drives the filter 32 so that strobe flashlight emanating from the discharge tube 21 will have the normal spectrum (step S5). Control is then passed to step S6. Specifically, the filter 32 is moved to the position distanced from the front of the reflector 31. Strobe flashlight emanating from the discharge tube 21 does not therefore pass through the filter 32 but has the normal spectrum.

At step 6, a shutter, that is not shown, is opened for photography. Based on the result of photometry performed at step S2, it is determined whether it is required to flash the strobe (step S7). When it is not required to flash the strobe, control is passed to step S9. When it is required to flash the strobe, the discharge tube 21 is flashed with the spectrum determined at steps S4 and S5 on the basis of the data resulting from range finding and photometry.

At step S9, the shutter is closed to complete photography. The film 9 is wound (step S10). During the film winding, the operation mode of the flashlight spectrum changing means 3; that is, information representing that red light contained in strobe flashlight is reduced is recorded in the magnetic recording area of the film 9 (step S11). Thereafter, film winding is terminated (step S12). The camera is returned to the initial state.

In this embodiment, red-eye phenomenon determination and flashlight spectrum changing are preceded by range finding and photometry. As long as they precedes strobe flashing, they may be performed any time. In this embodiment, recording of given information on film provided with a magnetic recording means is carried out any time for each frame during film winding. Alternatively, given information may be temporarily stored in a memory in the control means 1 and all information stored may then be recorded during film rewinding.

In this embodiment, the control means 1 changes the position of the filter 32 on the basis of the result of determination made by the red-eye phenomenon determinating means 7. Alternatively, the flashlight spectrum changing means 3 may be operated all the time and information provided by the flashlight spectrum changing means 3 may be recorded in the writing means 4. This alternative would pose no problem.

Factors of a red-eye phenomenon occurring in a camera will be described.

A red-eye phenomenon is a phenomenon that when a human being is photographed using a strobe in a dark place, the irises (more particularly, the insides of the pupils) of the human being appear in red in a print. This is attributable to the fact that very strong illumination of strobe light enters the retinae of the eyes for a short period of time, light that cannot be absorbed by the visual cells of the retinae is reflected and discharged outside the eyeballs. Specifically, the visible spectrum of flashlight of a strobe (xenon tube) is, as shown in FIG. 3, substantially identical to that of sunlight shown in FIG. 4.

Figure 10:
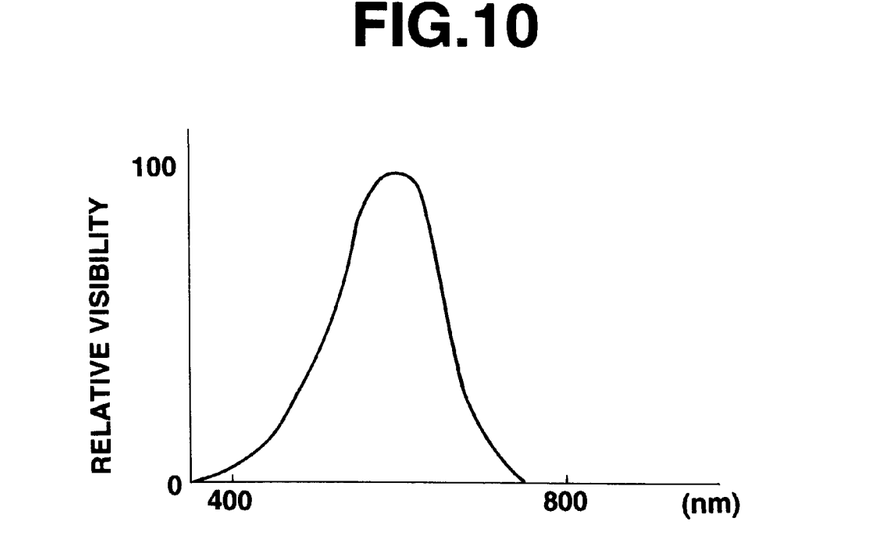
FIG. 10 is a graph indicating the visibility of a human eye.

FIG. 10 is a graph indicating the visibility of the human eyes.

As seen from FIG. 10, the visibility reaches the peak at a wavelength of about 550 nm. As the wavelength becomes smaller or larger than 550 nm, the visibility gets worse. The visibility is comparable to the light absorbance of the visual cells of the retinae. The higher visibility means that a larger amount of light is absorbed. The lower visibility means that a smaller amount of light is absorbed. The visual cells of the retinae are divided two groups of cells. One group consists of cone cells that work when it is bright and the other group consists of rod cells that work when it is dark.

Figure 11:
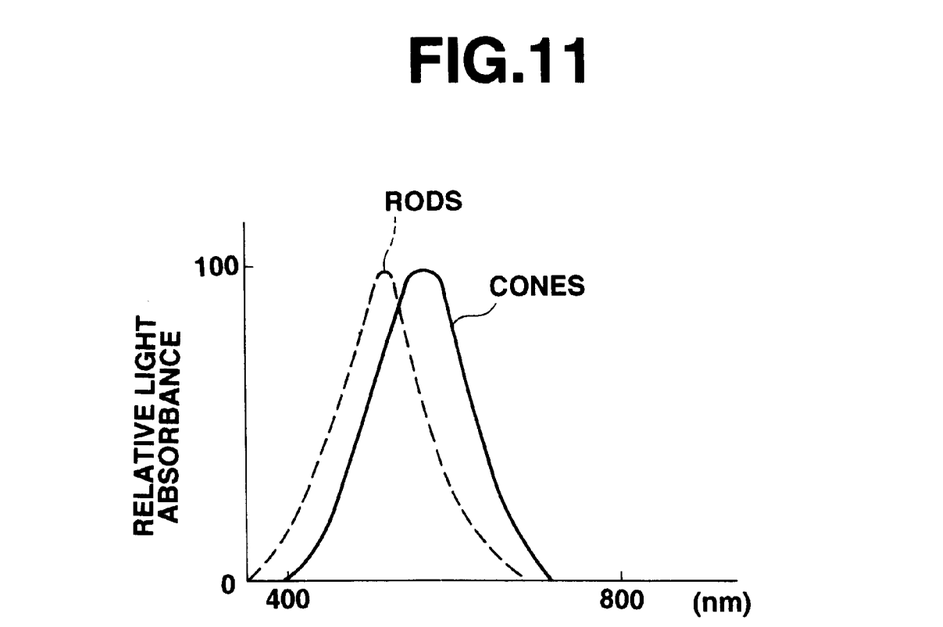
FIG. 11 is a graph showing characteristic curves plotted to indicate the absorbances of the visual cells in the retina of the eye.

FIG. 11 is a graph showing characteristic curves plotted to indicate light absorbances of the two groups of visual cells.

As shown in FIG. 11, the two groups of visual cells have different visibilities. The cone cells that work when it is dark have higher visibilities or light absorbances at smaller wavelengths and lower light absorbances at larger wavelengths. During stroboscopic photography, an amount of ambient light is small and the environment is dark. The human eyes use the cone cells thereof to see surrounding objects.

When strobe flashlight having the spectrum shown in FIG. 3 enters the eyes, the eyes use the cone cells thereof shown in FIG. 11 to absorb the strobe flashlight. Part of the strobe flashlight having wavelengths of about 550 nm is absorbed almost completely. The other light having smaller or larger wavelengths is not absorbed but reflected.

Figure 12:
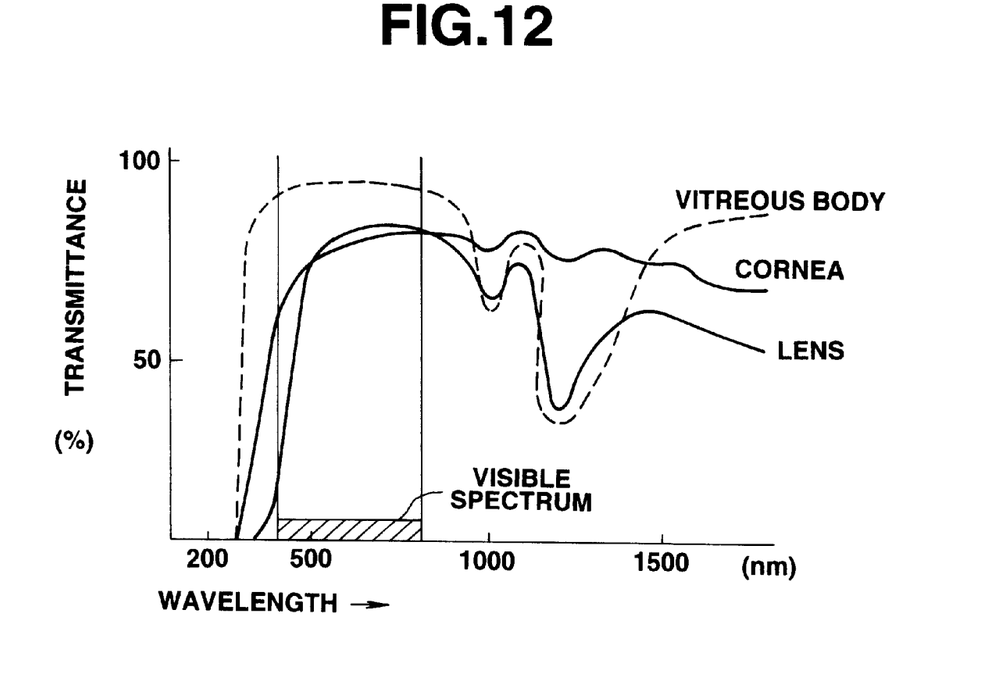
FIG. 12 is a graph showing characteristic curves plotted to indicate the absorbances of the cornea, lens, and vitreous body of the eyeball.

FIG. 12 is a graph showing characteristic curves plotted to indicate light absorbances of the cornea, lens, and vitreous body of the eyeball.

As illustrated, the cornea, lens, and vitreous body of the eyeball absorb light having relatively small wavelengths (500 to 600 nm inclusive) but pass light having larger wavelengths. Among light entering the eyes, light having small wavelengths is almost completely absorbed in the course of passing through the eyes twice; that is, in the course of entering the eyes and reflecting from or getting out of the eyes. However, light having large wavelengths; that is, red light is not absorbed but reflected and discharged by the eyes. This results in a red-eye phenomenon.

Figure 13:
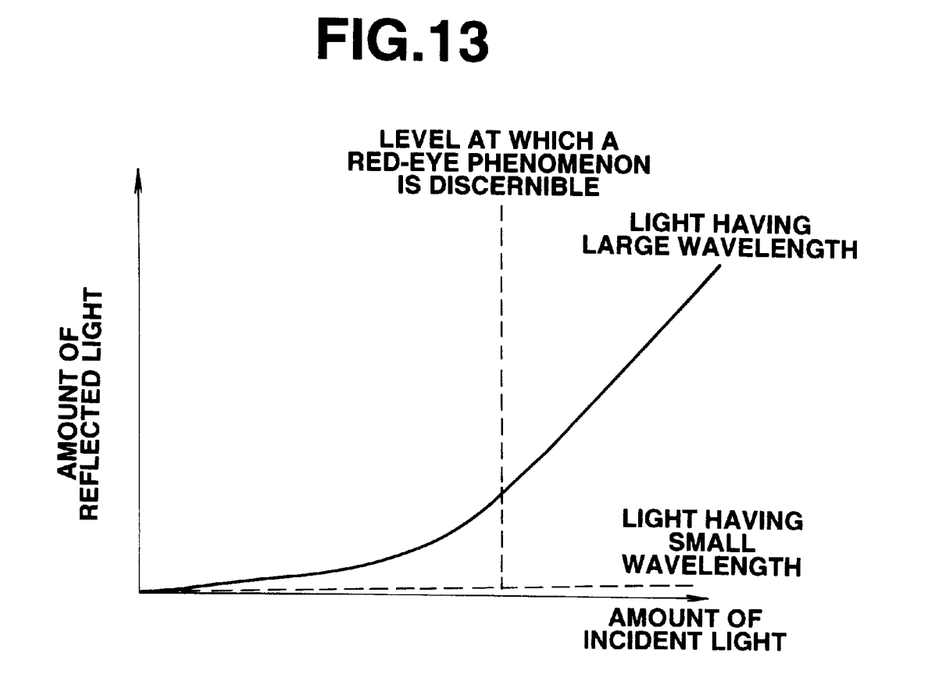
FIG. 13 is a graph indicating the relationship between the amount of light entering the eyeballs and the amount of light reflected from the eyeballs.

FIG. 13 is a graph showing the relationship between the amount of light entering the eyeballs and the amount of light reflecting from the eyeballs.

As illustrated, when the amount of light entering the eyeballs is small, the visual cells absorb light having large and small wavelengths. The amount of reflected light is therefore limited. When the amount of light entering the eyeballs increases, light having small wavelengths is, as mentioned above, absorbed by the corneas, lenses, and vitreous bodies. The amount of reflected light is therefore limited. As for light having large wavelengths, the visual cells are saturated with absorbed light and therefore reflect light by an amount corresponding to the increase in the amount of incident light. When the amount of reflected light exceeds a certain value or a level at which reflected light is discerned as a red-eye phenomenon, a red-eye phenomenon occurs.

Next, a method of alleviating a red-eye phenomenon in this embodiment will be described.

A red-eye phenomenon occurs, as mentioned above, when the visual cells are saturated with absorbed light of large wavelengths and excessive light is discharged outside of the eyeballs. If the amount of light having large wavelengths (red light) to be emitted by a strobe is reduced, reflection of red light from the eyeballs can be minimized.

Table 1 lists the light absorbances and reflectances by the eyes at the time of normal strobe flashing performed in the camera of the first embodiment and at the time of flashing with a reduced amount of red light. Also listed in the table are the light absorbances and reflectances by a normal red object at the time of normal strobe flashing and at the time of flashing with a reduced amount of red light. In the table, an amount of red light contained in light emitted by a strobe during normal flashing rates as 100.

|  | Normal flashing with an amount of red light rating as 100 | Flashing with a 40 %-reduced amount of red light 100 × 0.6 = 60 |  | Printing with a 1.67-fold amount of red light |
|---|---|---|---|---|
| Absorbance by the eyes | 20 | 20 | The absorbance by the eyes is saturated and is not varied. | — |
| Reflectance by the eyes | 80 | 40 |  | 67 |
| Absorbance by a normal red object | 5 | 3 |  |  |
| Reflectance by a normal red object | 95 | 57 |  | 95 (restored) |

As seen from the above table, the amount of red light contained in light emitted by a strobe during normal flashing rates as 100. Generally, the amount of red light absorbed by the retinae of the eyes rates as 20. The amount of red light reflected from the eyes and rendered in a picture rates as 80. The reflectance is therefore calculated as 80/100=0.8.

Assuming that the amount of red light emitted by a strobe is reduced by 40% to rate as 60, the amount of red light absorbed by the retinae of the eyes still rates as 20 but does not change from the one provided during normal flashing. This is because the light absorbance of the eyes is saturated. The amount of red light reflected from the eyes is calculated as 60−20=40. The reflectance is calculated as 40/80=0.5. Consequently, when the amount of red light is reduced by 40%, the reflectance of red light from the eyes decreases by 50%. When it says herein that the amount of red light is reduced, it means that the spectrum of red light within the spectrum of strobe light is diminished.

The first embodiment is concerned with the above point. The amount of red light reflected from the eyeballs is reduced by removing some wavelengths of red light from the spectrum of strobe flashlight, whereby a red-eye phenomenon is alleviated.

When red light contained in strobe light is simply reduced, it is presumed that the color balance of a picture would break down and a bluish picture would ensue. In this embodiment, information indicating that the amount of red light has been reduced is recorded in a magnetic recording area of film, so that printing will be carried out with red light, for example, cyan light increased. Thus, the conventional color balance is attained.

Referring to Table 1, the amount of red light is reduced to be 60% of the light occurring during normal flashing for flashing in accordance with this embodiment, and then increased to be 1.67 times as much as the one occurring during normal printing for printing in accordance with this embodiment. For example, normal red (red paper or the like) is restored at the rate of 95% resulting from an expression $(100 \times 0.6 - 3) \times 1.67$. As for the reflectance of light from the eyes, the reflectance during normal stroboscopic photography is calculated as $100 - 20 = 80$. In this embodiment, it is calculated as $(100 \times 0.6 - 20) \times 1.67 = 66.8$. Thus, the amount of red light reflected from the eyes is reduced. The reflectance from the eyes becomes smaller than that occurring during normal strobe flashing. Although the amount of red light is increased for printing, a red-eye phenomenon equivalent to the one resulting from normal strobe flashing does not occur.

As described so far, according to the camera of the first embodiment, the reflectance of red light contained in strobe light from the eyeballs is limited to alleviate a red-eye phenomenon.

Next, the second embodiment of the present invention will be described.

Figure 14:
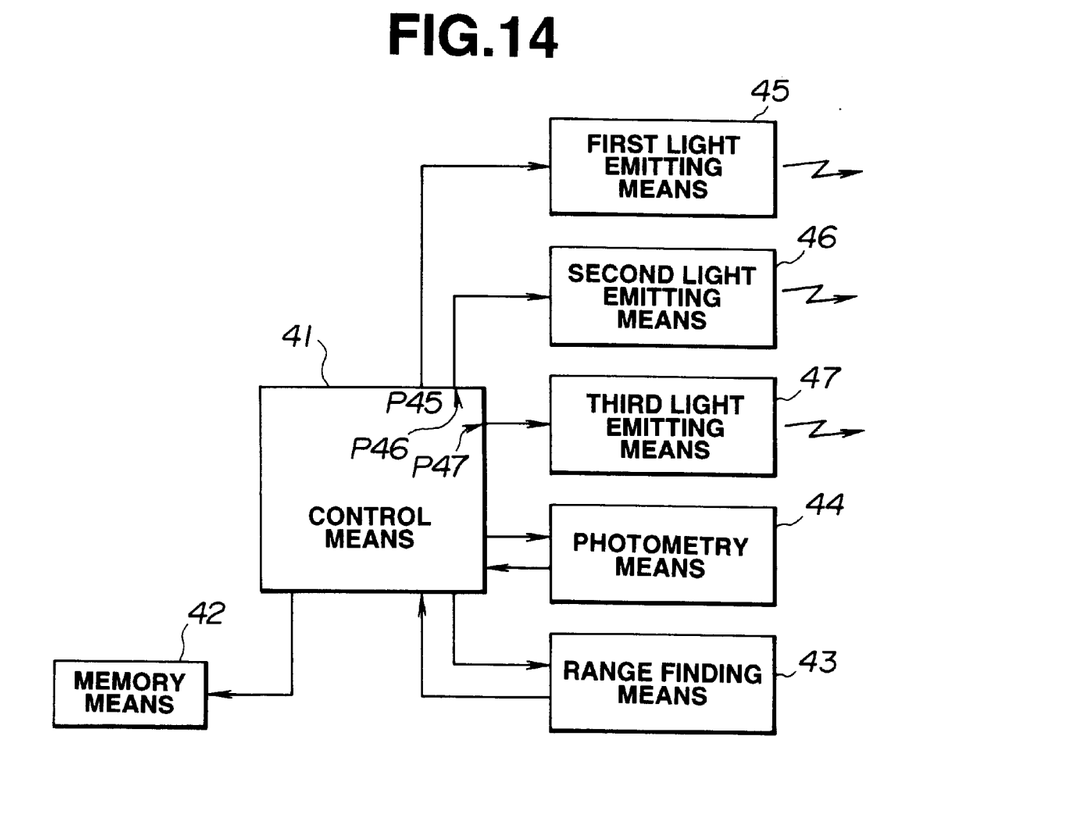
FIG. 14 is a block diagram showing the major components of a camera having a strobe unit in accordance with a second embodiment of the present invention.

FIG. 14 is a block diagram showing the major components of a camera having a strobe unit in accordance with the second embodiment.

The second embodiment comprises a control means 41, a writing (memory) means 42, a range finding means 43, a photometry means 44, a first light emitting means 45, a second light emitting means 46, and a third light emitting means 47. The writing (memory) means 42, range finding means 43, and photometry means 44 are equivalent to the writing means 4, range finding means 5, and photometry means 6 in the first embodiment, and will therefore not be described in detail.

Figure 15:
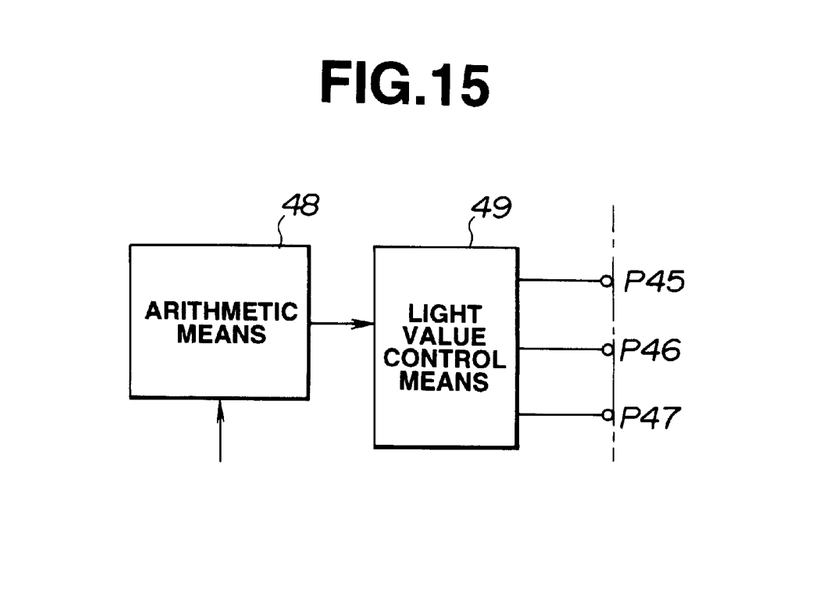
FIG. 15 is a block diagram showing the major components of a control means in the camera of the second embodiment.

FIG. 15 is a block diagram showing the major components of the control means 41.

The control means 41 plays substantially the same role as the control means 1 in the first embodiment but is additionally provided with the circuit elements shown in FIG. 15. Specifically, the control means 41 includes an arithmetic means 48 for calculating an amount of strobe light with which a strobe should be flashed and also calculating the amounts of light to be emitted by the first to third light emitting means 45 to 47, and a light value controlling means 49 for transmitting a light value signal to each of the first to third light emitting means 45 to 47 according to the results of a calculation made by the arithmetic means 48. Reference alphanumeric characters P45, P46, and P47 denote control ports of the control means 41. The control ports P45, P46, and P47 are linked with the first to third light emitting means 45 to 47.

Figure 16:
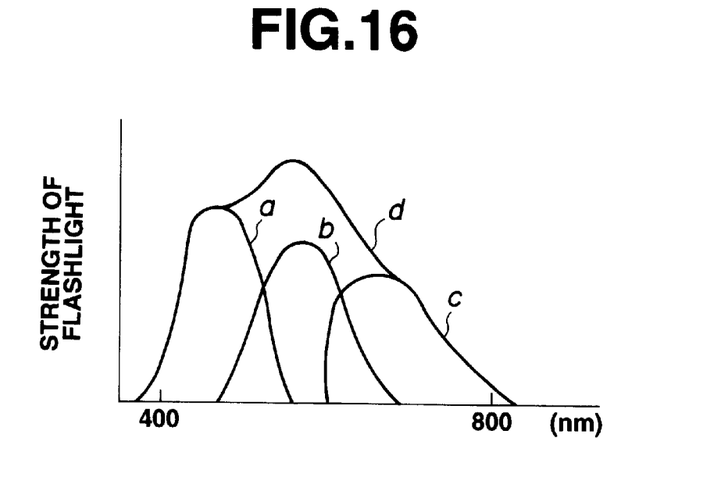
FIG. 16 is a graph indicating the spectra of flashlight emanating from first to third flashing means in the camera of the second embodiment.

FIG. 16 is a graph indicating spectra of flashlight emanating from the first to third light emitting means 45 to 47.

In FIG. 16, reference alphabetic characters a, b, and c denote spectra of flashlight emanating from the first light emitting means 45, second light emitting means 46, and third light emitting means 47 respectively. The amounts of light emanating from these light emitting means are adjustable. When the three light emitting means are flashed at a given ratio of amounts of light, the spectrum similar to the one of sunlight shown in FIG. 4 is obtained as indicated with d in FIG. 16. As seen from FIG. 16, the spectrum of flashlight emanating from the third light emitting means 47 includes larger wavelengths than the spectra of flashlight emanating from the other two light emitting means. The flashlight emanating from the third light emitting means 47 contains more red light.

In the second embodiment, when the situation is prone to a red-eye phenomenon, the amount of light emanating from the third light emitting means 47 is reduced slightly from the one calculated on the basis of the given ratio of amounts of light. Thus, less red light is emitted in order to alleviate a red-eye phenomenon.

As mentioned above, in the second embodiment, a plurality of light emitting means are included. The amount of light selected to emanate from the one of the light emitting means which emits red light is reduced in order to decrease the reflectance of red light from the eyeballs.

The first to third light emitting means 45 to 47 may be realized with any kind of light emitting source as long as the spectra a, b, and c in FIG. 16 are ensured. A light emitting body such as a xenon tube, a halogen lamp, and an LED krypton lamp can be employed.

The spectra of flashlight emanating from such light emitting sources are not limited to the ones shown in FIG. 16. All that matters is that the combination of the spectra of flashlight emanating from a plurality of light emitting bodies (the number of light emitting bodies is not limited to three) has the same color temperature as the spectrum of sunlight.

Next, the third embodiment of the present invention will be described.

Figure 17:
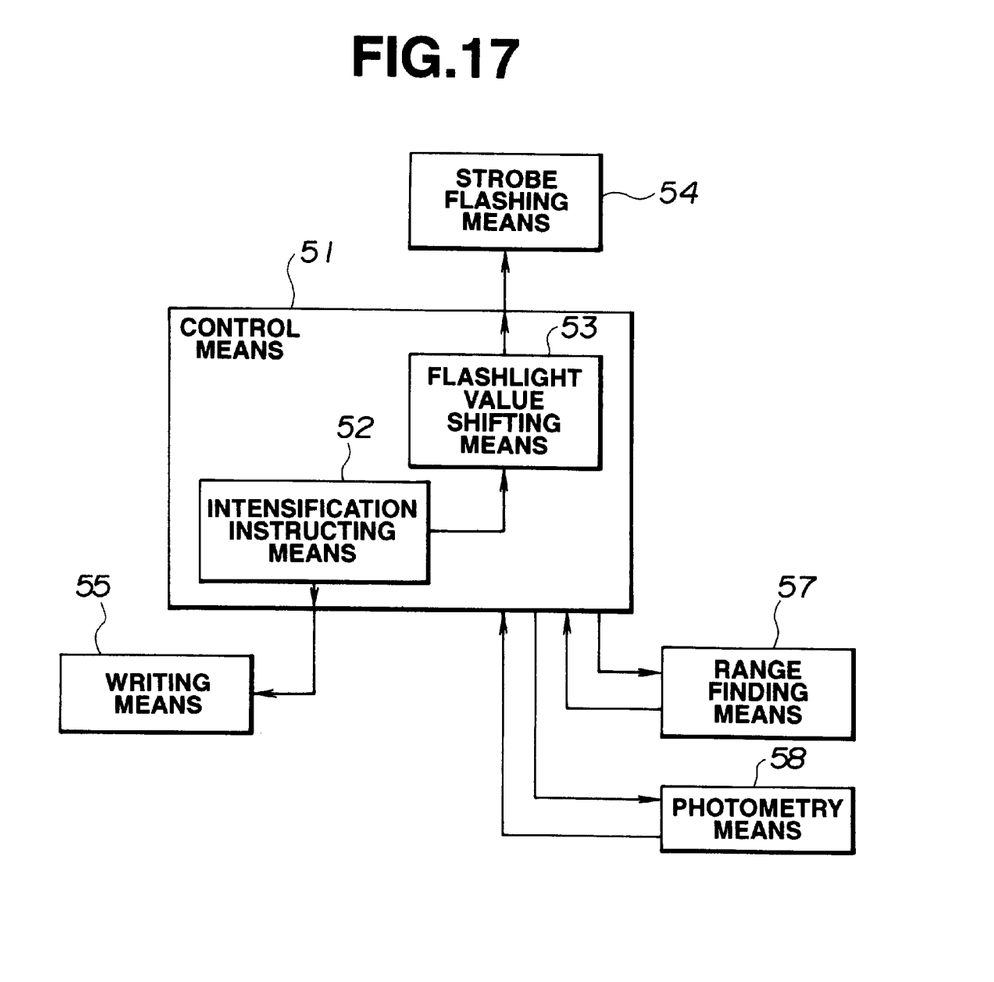
FIG. 17 is a block diagram showing the major components of a camera having a strobe unit in accordance with the third embodiment of the present invention.

FIG. 17 is a block diagram showing major components of a camera in accordance with the third embodiment.

As illustrated, the camera of the third embodiment comprises a control means 51, a strobe flashing means 54, a writing means 55, a range finding means 57, and a photometry means 58. The strobe flashing means 54, writing means 55, range finding means 57, and photometry means 58 are identical to the strobe flashing means 2, writing means 4, range finding means 5, and photometry means 6 in the first embodiment, and will therefore not be described in detail.

The control means 51 plays substantially the same role as the control means 1 in the first embodiment. The control means 51 further includes an intensification instructing means 52 and a flashlight value shifting means 53.

When film is loaded in the camera, the intensification instructing means 52 in the control means 51 allows the writing means 55 to write an instruction, which says that the film should be intensified during developing, on the film provided with a magnetic recording means that is not shown. The intensification instructing means 52 transmits a light value reduction signal to the flashlight value shifting means 53 so that an amount of strobe flashlight will be reduced by an amount of light used for the intensification. A smaller amount of flashlight is emitted for stroboscopic photography in order to provide a proper exposure value. When it says that an amount of strobe light is reduced, it means that an amount of red light is also reduced. As described concerning the first embodiment, a red-eye phenomenon is alleviated.

In the third embodiment, the flashlight value shifting means 53 operates according to the output of the intensification instructing means 52. Alternatively, the flashlight value shifting means 53 may reduce an amount of flashlight according to the estimated latitude of film. This alternative will pose no problem.

In the aforesaid embodiments, only the red light that reflects from the eyeballs is reduced in order to alleviate a red-eye phenomenon. These embodiments may be combined with a known technical art or a method for alleviating a red-eye phenomenon by performing pre-flashing prior to stroboscopic photography and thus shrinking the pupils.

In the aforesaid embodiments, a strobe flashing means may be a so-called flat flashing type flashing means designed to provide a given amount of light by keeping a peak amount of flashlight constantly low and prolonging flashing time.

In the aforesaid embodiments, information is recorded magnetically in a magnetic recording medium on film. The present invention is not limited to this working mode. Alternatively, information may be recorded optically on film. When an IC memory is incorporated in a Patrone, information may be recorded in the IC memory.

In the present invention, it will be apparent that a wide range of different working modes can be formed on the basis of the invention without departing from the spirit and scope of the invention. This invention is not restricted to any specific embodiment but is limited only by the appended claims.

What is claimed is:

1. A camera having a strobe unit, comprising:
   a strobe flashing means for emitting illumination light toward an object;
   a switching means for switching states of flashlight emanating from said strobe flashing means by selecting one of a normal flashlight and a flashlight that is effective for alleviating a red-eye phenomenon and that contains less red light than normal flashlight does;
   an information recording means for recording photographic information on a film, and
   a recording control means for allowing said information recording means to record a flashlight selected by said switching means.

2. A camera according to claim 1, wherein said switching means selects said flashlight effective for alleviating a red-eye phenomenon by reducing red light by an amount more than other light components of light emanating from a flash lamp in said strobe flashing means.

3. A camera according to claim 1, wherein said switching means selects said flashlight effective for alleviating a red-eye phenomenon by reducing a total amount of light emanating from said strobe flashing means, and said recording control means controls said information recording means to record information representing an intensification instruction for instructing an insertion of an amount of light reduced from said total amount, said insertion being provided during an operation for producing a print of an image on said film that was photographed using said reduced amount of total light.

4. A camera having a strobe unit, comprising:
   a strobe flashing means for emitting illumination light toward an object;
   a strobe flashlight changing means for changing a spectrum of visible light emitted by said strobe flashing means for purpose of red-eye reduction;
   a magnetic recording means for recording given photographic information in a magnetic recording medium on a film;
   a strobe flashlight checking means for check that strobe flashlight emanating from said strobe flashing means has been changed by said strobe flashlight changing means; and
   a recording control means that, when said strobe flashing means flashes, causes said magnetic recording means to record on said magnetic recording medium information concerning correction of a print of an image associated with said information according to a result of checking made by said strobe flashlight checking means to compensate for a change in a spectrum of visible light.

5. A camera having a strobe unit, comprising:
   a strobe flashing means for emitting illumination light toward an object;
   a strobe flashlight changing means for changing a spectrum of visible light emitted by said strobe flashing means for purpose of red-eye reduction;
   a magnetic recording means for recording given photographic information in a magnetic recording medium on a film;
   a strobe flashlight checking means for check that strobe flashlight emanating from said strobe flashing means has been changed by said strobe flashlight changing means; and
   a recording control means that, when said strobe flashing means flashes, causes said magnetic recording means to record on said magnetic recording medium information concerning correction of a print of an image associated with said information according to a result of checking made by said strobe flashlight checking means to compensate for a change in a spectrum of visible light, said information concerning correction of a print representing an amount of cyan light contained in strobe flashlight checked by said strobe flashlight determining means.

6. A camera having a strobe unit, comprising:
   a light source for emitting illumination light toward an object;
   a flashlight spectrum changing means for selectively reducing red light in a visible range contained in illumination light emanating from said light source for preventing red-eye phenomenon;
   a red-eye phenomenon determining means for determining whether an image to be photographed is prone to a red-eye phenomenon; and
   a control means that when said red-eye phenomenon determining means determines that a red-eye phenomenon may occur, activates said flashlight spectrum changing means.

7. A camera according to claim 6, wherein said determining means determines whether a red-eye phenomenon occurs by means for evaluating a distance to an object, brightness of an object, and a power of a taking lens.

8. A camera according to claim 6, wherein said flashlight spectrum changing means includes an optical filter means and an actuator for moving the optical filter means between a position at which light emanating from said light source is not affected by the filter means and a position at which said light is affected by the filter means.

9. A camera according to claim 8 where said actuator comprises a motor.

10. A strobe unit, comprising:
    a plurality of light sources for emitting flashlights said sources having different spectra;
    a red-eye phenomenon determining means for determining whether an image to be photographed is prone to a red-eye phenomenon; and
    a flashlight control means that when said red-eye phenomenon determining means determines that a red-eye phenomenon will not occur, allows said plurality of light sources to flash at a given ratio of amounts of light so that a combination of the spectra of light emanating from said plurality of light sources resemble a spectrum of sunlight, and that when said red-eye phenomenon determining means determines that a red-eye phenomenon may occur, controls flashing of said plurality of light sources so that flashlight emanating from said plurality of light sources will contain less red light than a flashlight emitted at said given ratio of amounts of light.

11. A strobe unit, comprising:

a strobe flashing means for emitting illumination light toward an object;

a flashlight spectrum changing mens for changing a spectrum of flashlight emanating from said strobe flashing means; and a control means that when an image to be photographed is prone to a red-eye phenomenon, activates said flashlight spectrum changing means.

12. A camera according to claim 11, wherein said flashlight spectrum changing means is an optical filter for selectively reducing red light in the visible range contained in light emanating from a light source.

13. A strobe unit, comprising:

a strobe flashing means for emitting illumination light toward an object;

a flashlight spectrum changing means for changing a spectrum of flashlight emanating from said strobe flashing means; and a control means that when an image to be photographed is prone to a red-eye phenomenon, activates said light spectrum changing means, said flashlight spectrum changing means including a plurality of flashing units for flashing light of different colors, and said flashlight spectrum changing means changes a ratio of contributions to flashing of said plurality of flashing units.

14. A strobe unit, comprising:

a strobe flashing means for emitting illumination light toward an object;

a flashlight spectrum changing means for changing a spectrum of flashlight emanating from said strobe flashing means;

a determining means for determining whether a red-eye phenomenon is prone to occur;

a flashing control means that, when said determining means determines that a red-eye phenomenon may occur, controls said strobe flashing means so that an amount of flashlight emanating from said strobe flashing means will not reach a level at which an amount of light entering a retinae is discerned as a red-eye phenomenon, said determining means determining that a red-eye phenomenon may occur, said flashing control means reduces red light more than other light components of light emanating from a flash lamp is said strobe flashing means.

15. A camera according to claim 14, wherein said strobe unit is mounted in said camera, and said determining means including means which makes a determination on the basis of a brightness of an object and a distance thereto.

16. A camera according to claim 14, wherein when said determining means determines that a red-eye phenomenon may occur, said flashing control means reduces red light more than other light components of light emanating from a flash lamp is said strobe flashing means.

17. A camera according to claim 14, wherein when said determining means determines that a red-eye phenomenon may occur, said flashing control means reduces an amount of flashlight emanating from said strobe flashing means as a whole.

18. A strobe unit, comprising:

a strobe flashing means for emitting illumination light toward an object;

a flashlight spectrum changing means for changing a spectrum of flashlight emanating from said strobe flashing means;

a deter mining means for determining whether a red-eye phenomenon is prone to occur;

a flashing control means that, when said determining means determines that a red-eye phenomenon may occur, controls said strobe flashing means so that an amount of flashlight emanating from said strobe flashing means will not reach a level at which an amount of light entering a retinae is discerned as a red-eye phenomenon; and an information recording means that, when said flashing control means performs flashing in such a manner as to alleviate a red-eye phenomenon, records that flashing in performed in such manner.

19. A camera having a strobe unit, comprising:

a strobe flashing means for emitting illumination light toward an object;

a strobe flashlight changing means for reducing the amount of visible light emanating from said strobe flashing means for the purpose of red-eye reduction;

a magnetic recording means for recording given photographic information in a magnetic recording medium on a film;

a strobe flashlight checking means for checking that strobe flashlight emanating from said strobe flashing means has been changed by said strobe flashlight changing means; and a recording control means that, when said strobe flashing means flashes, causes said magnetic recording means to record on said magnetic recording medium information concerning correction of a print of an image associated with said information according to a result of checking made by said strobe flashlight checking means to compensate for the reduction of visible light.

20. A camera having a strobe unit, comprising:

a strobe flashing means for emitting illumination light toward an object;

a strobe flashlight changing means for reducing the amount of light emanating from said strobe flashing means for the purpose of red-eye reduction;

a magnetic recording means for recording given photographic information in a magnetic recording medium on a film; a strobe flashlight checking means for checking that strobe flashlight emanating from said strobe flashing means has been changed by said strobe flashlight changing means; and a recording control means that, when said strobe flashing means flashes, causes said magnetic recording means to record on said magnetic recording medium information concerning correction of a print of an image associated with said information according to a result of checking made by said strobe flashlight checking means, said information concerning correction of a print representing an amount of cyan light contained in strobe flashlight checked by said strobe flashlight determining means.

* * * * *

UNITED STATES PATENT AND TRADEMARK OFFICE
CERTIFICATE OF CORRECTION

PATENT NO. : 5,991,549
DATED : November 23, 1999
INVENTOR(S) : Keiichi Tsuchida

It is certified that error appears in the above-identified patent and that said Letters Patent is hereby corrected as shown below:

IN THE CLAIMS

<u>Column 13,</u>
Line 14, delete the word "mens" and insert therefor --means--.

<u>Column 14,</u>
Line 10, after the word "a", delete "deter" and "mining" and insert therefor --determining--.

Signed and Sealed this

Twelfth Day of June, 2001

*Attest:*

*Attesting Officer*

NICHOLAS P. GODICI
*Acting Director of the United States Patent and Trademark Office*